Jan. 23, 1968 G. D. BRADLEY 3,364,838
CABINET FOR MOUNTING, ENCLOSING AND COOLING
ELECTRICAL APPARATUS
Filed Feb. 1, 1966 2 Sheets-Sheet 2
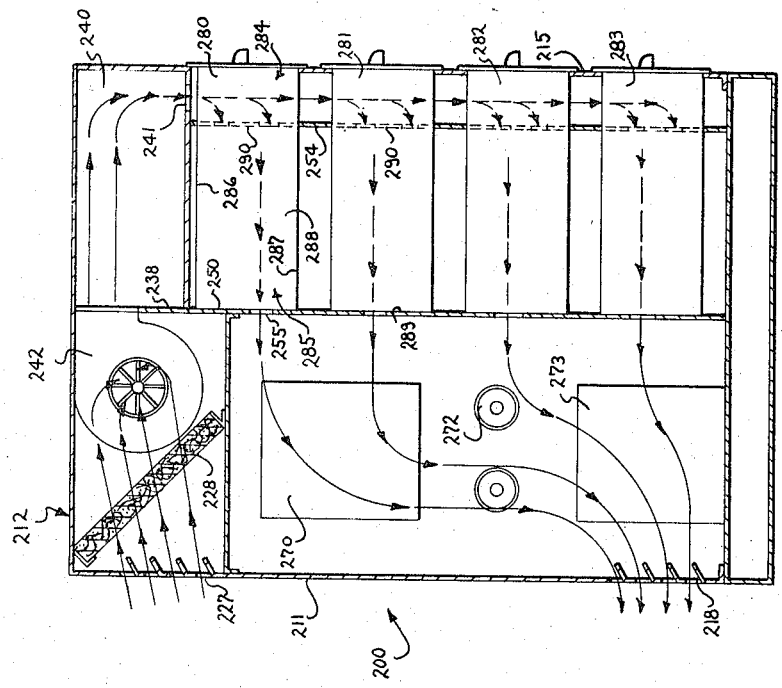
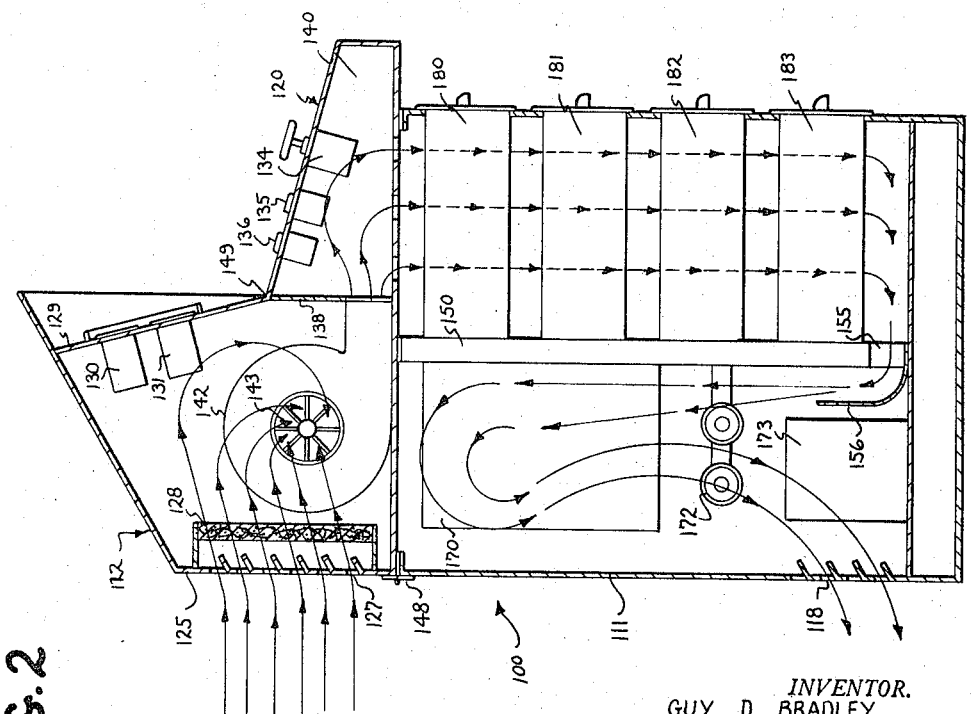
INVENTOR.
GUY D. BRADLEY
BY
HIS ATTORNEY

United States Patent Office 3,364,838
Patented Jan. 23, 1968

3,364,838
CABINET FOR MOUNTING, ENCLOSING AND COOLING ELECTRICAL APPARATUS
Guy D. Bradley, Erie, Pa., assignor to General Electric Company, a corporation of New York
Filed Feb. 1, 1966, Ser. No. 524,083
10 Claims. (Cl. 98—33)

This invention relates to electrical equipment cabinets and more particularly to a novel construction for enclosing, mounting and cooling electrical apparatus having different temperature capability limits and at least some of which apparatus generates heat during normal operation.

For many applications, especially industrial applications, it is desirable to combine the functions of power conversion of alternating to direct current, regulation and control and an operator's control station all in a single cabinet. Because of the nature of the different apparatus required to provide these different functions, however, attempts to employ the conventional type enclosures having some type of desk-like working surface have been unsatisfactory for this purpose. For example, the heat generated by various of the apparatus causes the walls of the cabinet to be heated especially heating the upper desk-like surface often to such an extent that it becomes uncomfortable for the operator to work thereon. In addition, this heated air tends to collect in the upper-most portions of the cabinet where the meters and other electrical instruments have usually been located in such conventional cabinets. This is, of course, undesirable since if such meters or instruments are temperature sensitive their accuracy is adversely affected. Further, when natural or forced convection cooling is employed the cooling air has usually been drawn in near floor level where it is likely to be contaminated with dust and the like to be discharged at the top where the heated air can flow toward the operator causing physical discomfort. Moreover, some of the electrical apparatus which must be included to provide the desired functions has a relatively low temperature capability limit whereas other apparatus has a very high temperature capability limit. This is especially so when some of the apparatus employed utilizes semiconductor devices the operating life of which will be significantly reduced if too great a temperature rise takes place due to inadequate cooling. In order to provide any kind of satisfactory cooling of these lower temperature capability limit apparatus, large volumes of air are required with the conventional types of cabinet constructions and even then variations in electrical loading and regions of stagnant air in the cabinet have been found to cause undesirable changes in system performance since the temperature of various temperature sensitive apparatus varies under such conditions.

It is an object of this invention, therefore, to provide a cabinet which is particularly adapted for the mounting, enclosing and cooling of various different types of electrical apparatus having different temperature capability limits which substantially overcomes one or more of the foregoing disadvantages and which cabinet is essentially free of sources of operator discomfort.

It is another object of this invention to provide a cabinet which is particularly adapted to provide an operator's control station and an enclosure for mounting and cooling various different types of electrical apparatus in a manner that the different temperature capability limits of such apparatus are accommodated with a minimum air flow volume and with the cabinet walls adjacent the operator maintained at a physically comfortable operating temperature.

It is still another object of this invention to provide a novel method of mounting, enclosing and cooling electrical apparatus having different temperature capability limits.

Briefly stated, in accordance with one aspect of this invention, there is provided an electrical apparatus cabinet particularly adapted for enclosing and cooling various pieces of electrical apparatus having a number of different temperature capability limits. The cabinet includes an open-topped body formed by a bottom horizontal wall member connected to spaced-apart front, back and side vertical wall members. Means are provided for dividing the inside of the body vertically into first and second compartments which have a restricted air flow communication passage provided therebetween. Means are further provided for mounting electrical apparatus having a temperature capability limit below a preselected level in the first compartment and electrical apparatus having a temperature capability limit above that preselected level in the second compartment. Further, the electrical apparatus is preferably arranged in the first and second compartments from top to bottom in the order of increasing temperature capability limit. Means are also provided for establishing a flow of air to the cabinet which is operative to pressurize and cool the body and the electrical apparatus arranged therein by provision of a series air flow paths which begins at the top of the first compartment, knows therethrough and through the air flow communication passage to the second compartment and through the second compartment for discharge.

The novel features believed characteristic of the invention are set forth with particularity in the appended claims. The invention itself, however, both as to its organization and method of operation together with further objects and advantages thereof may best be understood by reference to the following description taken in conjunction with the accompanying drawings in which:

FIGURE 2 is a similar schematic view of an electrical apparatus cabinet in accordance with another embodiment of the invention wherein a portion thereof is adapted to contain drawer mounted apparatus; and FIGURE 3 is a schematic sectional view of an electrical apparatus cabinet in accordance with still another embodiment of the invention.

Figure 1:
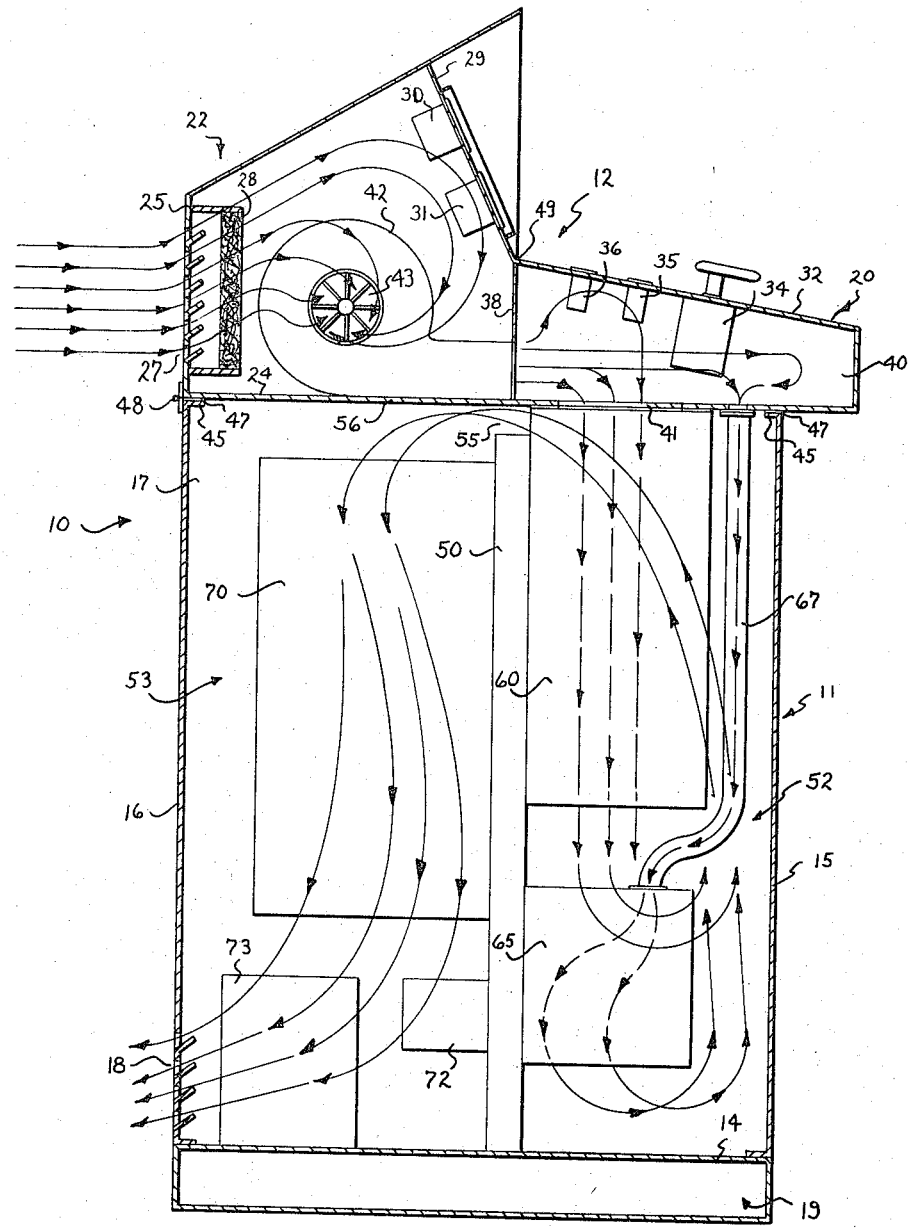
FIGURE 1 is a schematic sectional view of an electrical apparatus cabinet in accordance with an embodiment of the invention.

There are many obvious and practical reasons which make it desirable to include electrical apparatus capable of providing the different functions required for a given system in a single enclosing, mounting and cooling structure. Thus, for example, in an adjustable speed electric motor drive system the structure, in addition to providing an operator's control station, may be required to contain power apparatus for converting from alternating to direct current, control and regulating apparatus, electrical instruments, such as meters and the like, as well as various other types of electrical apparatus or devices such as switches, potentiometers and the like. In order to maintain the required system reliability and operating performance characteristics all of this electrical apparatus must be maintained at its respective safe operating temperatures. This has been a continuing source of difficulty in the prior art because of the fact that the temperature capability limit of some of the electrical apparatus or devices may be many times lower than that of some of the other apparatus, yet all of the apparatus must be massed within a single structure. Thus, for example, electrical apparatus such as transformers, dynamic braking resistors and contactors may be capable of safely accommodating a temperature rise of about 40 to 60° C. or more whereas semiconductor and other electronic devices, and apparatus incorporating such devices, may be capable of safely accommodating a temperature rise of only about 10 to 15° C. While a somewhat satisfactory solution may be provided, from the standpoint of protection of the apparatus, by circulating a sufficient volume of air through the structure to keep the overall temperature rise within the range of 10 to 15° C., such a solution is far from the being entirely satisfactory. Moreover, even with such a high volume of circulating air the walls of the structure tend to heat to an extent that the working surface of the operator control station, for example, becomes uncomfortably hot and the high volume and temperature of the air discharged from the structure further contributes to the physical discomfort of the operator.

In accordance with the present invention these problems are obviated by dividing the structure into a number of separate compartments which are in air flow communication with one another through restricted air flow communication passages. The various different types of electrical apparatus are then mounted and arranged in the different compartments in the order of increasing temperature capability limit. The different compartments and air flow communication passages therebetween are arranged so that when a cooling air flow is established to the air intake opening of the structure, air circulation is in a series path which begins at the compartment containing the lowest temperature capability electrical apparatus and flows toward those containing higher temperature capability limit apparatus and finally to the exhaust opening of the structure.

Referring now to the drawings, there is illustrated in FIGURE 1 one embodiment of the invention. As shown, there is provided a single structure 10 which provides an operator control console as well as an enclosure for mounting, and cooling various different types of electrical apparatus. The structure 10 includes two housing portions, a first, or lower body housing 11, and a second, or upper control console housing 12. Each of the housings 11 and 12 is provided with suitable air intake and exhaust openings so that cooling air may be circulated therethrough in a manner to be described in more detail later.

As shown, the first housing 11 is adapted for mounting and enclosing various different types of electrical apparatus and the second housing 12 provides for the operator control console as well as enclosing a suitable means for establishing air flow within the structure and for the mounting of various electrical apparatus and devices.

To this end, the first housing 11 comprises a bottom horizontal wall member 14 having a front vertical member 15, a back vertical wall member 16 and side vertical wall members 17, only one of which is illustrated, suitably interconnected to provide an open-topped enclosure having an exhaust opening 18 near the bottom region of back vertical wall member 16. Bottom horizontal wall members 14 may be suitably reinforced or have an additional structural member associated therewith so as to provide a suitable base 19.

The second housing 12 is disposed above the first housing and includes a front section 20 and a rear section 22 having a common bottom horizontal wall member 24. In the arrangement illustrated the back wall 25 of rear section 22 is provided with a louvered air intake opening 27, having an air filter means 28 associated therewith. The front of rear section 22 includes an inclined face panel 29 adapted for the mounting of electrical instruments, shown as the meters 30 and 31. The front section 20 of the second housing 12 extends beyond the front vertical wall member 15 and is provided with an inclined top surface 32 which has a portion adapted to provide a suitable desk-like working surface as well as a portion adapted for mounting various electrical devices, shown as a switch 34 and push-buttons 35 and 36.

The front section 20 is separated from the rear section 22 by a vertical transverse partition wall member 38 to form a plenum chamber 40. Portions of the electrical devices 34, 35 and 36 extend into the plenum chamber as shown. A blower means 42 is mounted in the rear section 22 with the intake side 43 thereof in air flow communication with the air intake opening 27 and the discharge side connected through an opening in partition wall member 38 to plenum chamber 40. The second housing is arranged to be sealingly positioned on top of the first housing 11 to provide a substantially air tight cover therefor. To this end, flanges 45 are provided at the top of each of the front, back and side walls upon which the bottom of housing 12 is supported. A suitable gasket means 47 is disposed between the flanges 45 and the bottom of housing 12 to effect the required seal therefor. Conveniently, to provide for easy access to the apparatus or devices inside, housing 12, or a portion thereof, may be pivotally connected to the first housing 11 as by the hinge means 48. Thus, alternatively, only the front section 20 may be so pivoted by a suitable hinge means located at the juncture 49 between panel 29 and top 32 of front section 20.

The first housing 11 is provided with a vertical transverse partition wall member 50 which vertically divides the space therein into a first compartment 52 and a second compartment 53. The partition wall member 50 is shorter than the other vertical wall members making up housing 11 and extends from the bottom horizontal wall member 14 toward the bottom of the second housing 12 which is provided by bottom horizontal wall member 24. Accordingly, an air flow communication passage 55 is provided between the two compartments which is defined by the top of the vertical transverse partition wall member 50 and the underside 56 of the bottom horizontal wall member 24. An air flow communication passage 41 is provided between the plenum chamber 40 and the top of the first compartment 52.

The vertical transverse partition wall member 50 is of sufficient strength and rigidity to allow for the mounting of electrical apparatus on opposite sides thereof so that some of such apparatus will extend into the first compartment and some will extend into the second compartment. The apparatus is arranged in the compartments in sequence in the order of increasing temperature capability limits. For example, the apparatus or devices having the lowest temperature capability limit will be positioned at the top of the first compartment 52 in direct air flow communictaion with the passage 51 in plenum chamber 40 and the electrical apparatus having the highest temperature capability limit will be positioned at the lower region of the second compartment.

For example, FIGURE 1, for purposes of illustration and explanation, shows a structure which provides the operator control station and enclosure for the various electrical apparatus associated with an adjustable speed electric motor drive wherein power conversion is provided by a controlled rectifier system employing semiconductor devices, specifically silicon controlled rectifier (SCR) devices. Accordingly, since the semiconductor power conversion apparatus unit 60 has the lowest temperature capability limit such unit is mounted on partition wall member 50 so that it extends into the first compartment 52. Moreover, to assure an adequate supply of the coolest air thereto, the unit 60 is positioned in direct air flow communication with the air passage 41 of plenum chamber 40. Other apparatus of slightly higher temperature capability limit may then be mounted below the unit 60 in the order of increasing temperature capability limit. Conveniently, where some additional apparatus, such as a regulator circuit means 65, may also employ semiconductor devices and have a low temperature capability limit, a supply of the coolest air may also be supplied directly thereto from plenum chamber 40 by means of a suitable duct 67, which may be a plastic tube or the like.

Electrical apparatus of still higher temperature capability limit, such as the direct current contactor assembly 70, is mounted on the opposite side of partition will member 50 so as to extend into the second compartment 53. Also the contactor assembly 70 is mounted near the top of partition wall member 50 so as to be proximate the air flow communication passage 55 between the first and second compartments. Similarly, the highest temperature capability limit apparatus such as the dynamic braking resistances 72 and the transformer or reactor means 73 are mounted near the lower regions of the second compartment.

From the foregoing description of the arrangement of the electrical apparatus it will be apparent that the power components of the system such as the contactors, power resistors, reactors, transformers and the like which are capable of accommodating a 40° C. or more temperature rise may be located in the lower region of the second compartment while apparatus or devices which are capable of accommodating a lesser temperature rise should be located nearer to the source of the air flow supply. One or more of the vertical wall members making up lower housing 11 may be provided with suitable removable portions, or the entire wall may be removable or hinged, to allow for convenient access to the electrical apparatus therein. This may be preferably provided by employing suitable doors at both the front and the back of housing 11 so that access may be had to the first and second compartments and to the apparatus mounted therein.

In the structure illustrated in FIGURE 1, cooling air is drawn into the intake side of blower means 42 through the louvered air intake opening 27 which air is suitably filtered by the filter means 28. That is, the air is drawn into the rear portion 22 of housing 12, which chamber is at a reduced pressure with respect to the ambient air outside the housing due to the operation of blower means 42. To assure effective functioning of the filter means 28 the rear portion 22 should be properly sealed. Accordingly, the apparatus, such as the meters 30 and 31, should be mounted so as to have a minimum of air leakage thereabout. Also these devices, which have a portion extending within the rear portion 22, will be operating surrounded by air at room temperature.

The blower means 42 discharges air at room temperature into the plenum chamber 40 and operates to pressurize such chamber at the maximum pressure of the air flow system. It will be apparent, therefore, that this chamber will be maintained at essentially room temperature so that the top working surface 32 will also be at essentially room temperature. Since plenum chamber 40 is pressurized the electrical apparatus projecting therein through the top surface wall 32 should be mounted so as to provide a minimum amount of air leakage.

The air from plenum chamber 40 then passes through the passage 41 and high pressure air is directed past the electrical apparatus in a series flow path which begins at the apparatus unit 60, containing the components of lowest temperature capability limit, passes into the second compartment and through the apparatus of higher temperature capability limit and finally past apparatus of highest temperature capability limit and out through the exhaust opening 18. Since plenum chamber 40 is pressurized, an additional opening is shown provided therein to bring some of this cool air directly to the regulator circuit means 65. The opening from the plenum chamber 40 to housing 11 forms a restricted air flow passage so that the pressure in the first compartment 52 is less than the pressure in the plenum chamber but greater than the pressure of the ambient air outside the structure 10. This pressure head insures a positive flow of air through the first compartment 52, as shown by the arrows, which air becomes slightly heated as it travels from top to bottom thereof and past the various types of apparatus mounted therein. As shown, the air then reverses direction and flows to the top of the first compartment 52 and through the restricted air flow passage 55 to the top of the second compartment 53.

The electrical apparatus 70, 72 and 73 which is mounted in the second compartment 53 generates heat which would tend to rise towards the top of the compartment. The high velocity air sweeping through the air flow passage 55, however, causes sufficient turbulence to prevent any accumulation of this heated air at the upper regions of compartment 53. The air pressure in the lower part of the second compartment 53 is still sufficiently higher than that of the ambient air outside the structure so that air is discharged from the compartment 53 to the outside through the louvered exhaust opening 18. Exhaust opening 18 is of a lesser area than that of the air intake opening 27 and is provided with downwardly sloping louvers. The smaller exhaust area adds to the pressure drop and results in a high discharge air velocity which is directed by the downwardly sloping louvers down and along the floor for a sufficient distance to prevent recirculation to the front and discomfort to the operator.

In FIGURE 2 there is illustrated another embodiment of the invention. As shown, the structure 100 is generally similar to that shown in FIGURE 1 having a lower housing portion 111 and an upper housing portion 112. The upper portion is arranged to provide an operator control station and includes a front section 120 the top 132 of which is adapted to provide a desk-like working surface as well as a means for mounting various electrical devices, such as, for example, the switch 134 and push buttons 135 and 136. This front section 120 has a rear vertical transverse wall 138 which in combination with the other wall members thereof forms a plenum chamber 140.

The upper housing portion 112 also includes a rear section 122 having in the rear vertical wall 125 thereof a louvered air intake opening 127 and an air filter means 128 associated therewith. The rear section 122 extends above the top 132 of the front section 120 and includes an inclined face panel 129 which is adapted for mounting electrical instruments, shown as meters 130 and 131. Face panel 129 is inclined at an angle with respect to the vertical to assure easy glare-free observation thereof by an operator.

Air flow to plenum chamber 140 is established by a suitable blower means 142 which preferably has a ratio of length to diameter greater than unity. Blower means 142 is mounted within the upper portion 112 in any suitable manner so that the air intake side thereof is in air flow communication with the air intake opening 127 and the discharge side thereof is connected through the partition wall member 138 to plenum chamber 140.

Although structure 100 may be a single enclosure divided horizontally into the upper and lower portions, it is often more convenient to provide two separate housings as illustrated. Thus, the upper housing portion, or second housing, 112 is sealingly positioned above the first or lower housing portion 111 and, to provide for easy access to the inside, may be pivotally mounted thereto as by the hinge means 148. Alternatively, the front section 120 only may be pivotally mounted by a hinge means (not shown) located at the junction 149 between face panel 129 and the top 132 of front section 120. Access to the apparatus in the rear section may be had through air intake opening 127.

The lower portion 111 is generally similar to that illustrated in FIGURE 1 including a vertical transverse partition wall member 150 for vertically dividing the lower portion 111 into a first compartment 152 and a second compartment 153. Also, the electrical apparatus is mounted and arranged in the first and second compartments in sequence beginning at the top of the first compartment in the order of increasing temperature capability limit.

In the arrangement of FIGURE 2 the first compartment is provided with suitable guide means (not shown) adapted to receive mating guide means of drawer-like racks in which electrical apparatus is mounted.

As shown, a number of such racks 180, 181, 182 and 183 are arranged from top to bottom in the first compartment and may be pulled out to provide access to the apparatus mounted therein. Each of the drawer-like racks 180–183 is open at both top and bottom so that air flow may be provided from the opening 141 of plenum chamber 140 to the bottom of the compartment 152 and through the air flow communication passage 155 to the second compartment 153. To direct the air flow to the upper regions of compartment 153 a suitable deflector means 156 is provided.

In operation, blower means 142 discharges air under pressure into the plenum chamber 140 and through the restricted opening or openings 141 therein to the top of the first compartment 152. The air then flows through the drawer-like racks 180, 181, 182 and 183 and past the apparatus contained therein to provide the desired cooling. Since the apparatus has been suitably arranged in the drawer-like racks 180–183 in the order of increasing temperature capability limit the cooler air passes the apparatus of lower temperature limit and as such air becomes heated, then passes apparatus of higher temperature capability limit, finally reaching the bottom of the first compartment 152 and then through passage 155 and past deflector 156 toward the upper regions of second compartment 153 and then downwardly through such compartment to the exhaust opening 118. As before, since exhaust opening 118 has less area than does air intake opening 127, the air is discharged at high velocity along the floor and away from the operator where it may cause him physical discomfort.

In FIGURE 3, there is shown still another embodiment of an enclosing and cooling structure 200 which provides for substantially uniform distribution of cooling air to the electrical apparatus. To this end, the structure 200 is provided as before with a lower housing portion 211 and an upper housing portion 212 which, although not illustrated as such, may, if desired, be arranged to provide an operator's console as in FIGURES 1 and 2. The upper portion contains the blower means 242 within the rear section 222 thereof with the front section 220 providing a plenum chamber 240 having a restricted opening 241 therein.

The lower portion 211 is provided with a vertical transverse partition wall member 250 which vertically divides such portion into a first compartment 252 and a second compartment 253. The first compartment is provided with a vertical transverse partition wall member 254 having a number of openings therein adapted to receive drawer-like enclosures 280, 281, 282 and 283; the first compartment being further provided with suitable guide means (not shown) which cooperate with mating guide means on the drawer-like enclosures so that such enclosures are removably positioned within the spaces defined by the vertical transverse partition walls 250 and 254 and the front vertical wall 215.

Each of the drawer-like enclosures has a front section 284 and a rear section 285. The rear section of each drawer-like enclosure is defined by a top and a bottom horizontal wall 236 and 287 respectively, side vertical walls 288, a rear vertical wall 289 and a front vertical wall 290. The front and rear vertical walls 290 and 289 are provided with air flow openings which register with restricted air flow passages 255 in vertical transverse partition wall member 250. Alternatively, by providing for a suitable seal between the partition wall 250 and the end of the drawer-like enclosures, the rear vertical wall 289 of such enclosures may be omitted.

The front section 284 of each of the drawer-like enclosures 280–283 forms a duct open at both top and bottom. These open ends are arranged and adapted to register, through the similar opening formed in the first compartment between vertical walls 215 and 290, with the open ends of adjacent drawer-like enclosures to provide a continuous duct extending from the top to the bottom of the first compartment thereby forming a second plenum chamber. The open top of the plenum chamber so formed is in direct air flow communication with the opening 241 of the first plenum chamber 240.

Electrical apparatus is then suitably mounted and arranged in the structure with the lower temperature capability limit apparatus in the drawer-like enclosures in the first compartment and the higher temperature capability limit apparatus in the second compartment. Thus, as shown, the power contactors 270, dynamic braking resistances 272 and transformer or reactor means 273 are arranged in the second compartments since such apparatus can safely accommodate a relatively high temperature; the apparatus in the drawer-like enclosures 280–283 disposed in the first compartment having a lower temperature capability limit. Preferably, the apparatus is mounted in such drawer-like enclosures from front to back in the order of increasing temperature capability limit if the particular apparatus contained in such enclosure includes apparatus of devices having slightly different temperature capability limits.

In operation, air enters the air intake openings 227 and is discharged under pressure from blower means 242 into plenum chamber 240. The air then enters the second plenum chamber formed by the front sections 284 of the drawer-like enclosures 280–283 and the space formed by the vertical wall 254 in the first compartment. Air from this vertically extending plenum chamber at the front of the first compartment then enters the drawer-like enclosures 280–283 in parallel paths through the restricted air passages in the vertical wall 290 and thence through the rear section 285 of the enclosure and electrical apparatus mounted therein. Air then enters the second compartment in parallel paths through the restricted air passages 225 in vertical transverse partition wall member 250 and flows past the apparatus mounted therein toward the exhaust opening 218 in the lower rear of the second compartment. The discharge air is directed downwardly and outwardly at high velocity where it is prevented from causing physical discomfort to an operator or other personnel located or passing in front of the structure.

While there have been described particular embodiments of the invention, it will be obvious to those skilled in the art that various changes and modifications may be made without departing from the invention. It is intended in the appended claims, therefore, to cover all such changes or modifications as fall within the true spirit and scope of the invention.

What I claim as new and desire to secure by Letters Patent of the United States is:

1. In a structure for mounting, enclosing and cooling electrical apparatus having different temperature capability limits, the combination comprising:
   (a) a housing including an upper portion having an air intake opening therein and a lower portion having an exhaust opening therein, said intake opening being of greater area than said exhaust opening;
   (b) a vertical transverse partition wall member extending within said housing and vertically dividing said housing into first and second compartments, said vertical transverse partition wall member having an opening therethrough providing a restricted air flow communication passage between said first and second compartments;

(c) means for mounting and including electrical apparatus within said housing in the order of increasing temperature capability limit so that the electrical apparatus having the lower temperature capability limit is disposed at the top of said first compartment and the electrical apparatus having the highest temperature capability limit is disposed at the bottom of said second compartment;

(d) means at the upper portion of said housing providing a first plenum chamber having a restricted opening therein in direct air flow communication with said first compartment; and (e) means for establishing a flow of air to said plenum chamber operative to pressurize said chamber and establish a series air flow path within said housing from the top of the bottom of said first compartment and through the restricted air flow passage in said vertical transverse partition wall member into said second compartment.

2. The structure of claim 1 wherein said electrical apparatus is mounted and arranged on opposite sides of said vertical transverse partition wall member so that some of said apparatus extends therefrom into said first compartment and some extends into said second compartment.

3. The structure of claim 1 wherein said means for establishing a flow of air to said plenum chamber is a blower means mounted in the upper portion of said housing.

4. The structure of claim 3 wherein said blower means has a ratio of length to diameter greater than unity.

5. The structure of claim 1 wherein the electrical apparatus in said first compartment is mounted and enclosed in a number of separate drawer-like enclosures adapted to be removably contained in said first compartment, each of said drawers having a duct at one end thereof the open ends of which are arranged and adapted to be in register with each other to provide a second plenum chamber extending from top to bottom of said first compartment and in direct air flow communication with said plenum chamber at the upper portion of said housing, said vertical transverse partition wall member being provided with restricted air flow passages adjacent each drawer-like enclosure to allow for air flow communication between said enclosures and said second compartment.

6. In a structure for mounting, enclosing and cooling electrical apparatus having different temperature capability limits the combination comprising:

(a) an enclosure including an upper portion means to provide a desk-like top working surface and a lower portion, said enclosure having an air intake opening at the rear of said upper portion and an exhaust opening the area of which is less than that of said air intake opening at the rear of said lower portion;

(b) means vertically dividing said upper portion into a rear compartment including said air intake opening and having an inclined face panel adapted for mounting electrical instruments and a front compartment providing a plenum chamber the top of which is adapted to provide the desk-like working surface as well as means for mounting electrical apparatus and devices;

(c) a vertical transverse partition wall member extending within said lower portion and vertically dividing said portion into first and second compartments;

(d) means establishing restricted air flow communication between said first and second compartments;

(e) means establishing restricted air flow communication between said plenum chamber and said first compartment;

(f) means for mounting and arranging electrical apparatus in said lower portion in the order of increasing temperature capability limit so that electrical apparatus having the lowest temperature capability limit is disposed near the top of said first compartment and apparatus having the highest temperature capability limit is disposed near the bottom of said second compartment; and (g) means for establishing a flow of air to said plenum chamber operative to pressurize said chamber and said lower portion and establish an air flow path from said plenum chamber toward the exhaust opening from the apparatus of lowest temperature capability limit toward that of highest temperature capability limit.

7. The structure of claim 6 wherein said means for establishing a flow of air to said plenum chamber is a blower means mounted within the rear compartment of said upper portion.

8. The structure of claim 7 wherein electrical apparatus is arranged on and mounted to opposite sides of said vertical transverse partition wall member so that some apparatus extends into said first compartment and some extends into said second compartment.

9. The structure of claim 7 wherein electrical apparatus in said first compartment is mounted and enclosed in a number of drawer-like enclosures adapted to be removably contained in said first compartment, each of said drawer-like rack enclosures having a duct at one end thereof the open ends of which are arranged and adapted to register with an opening in the first compartment and with the open ends of the ducts of vertically adjacent drawer-like enclosures to provide a second vertically extending plenum chamber having one end in direct air flow communication with the plenum chamber of said upper portion.

10. An electrical apparatus cabinet comprising:

(a) a first open-topped housing having a bottom horizontal wall member interconnected with front, back and side vertical wall members, said back vertical wall member having an exhaust opening provided in the lower portion thereof;

(b) a vertical transverse partition wall member disposed within said housing and extending from said bottom horizontal wall member to near the inside surface of said top horizontal wall member operative to divide the inside of said housing vertically into first and second compartments having a restricted air flow communicating passage therebetween defined by the top of said vertical transverse partition wall member and the inside surface of said top horizontal wall member, said vertical transverse partition wall member being located within said housing so that the air intake opening in said top horizontal wall member is directly associated with said first compartment;

(c) means for mounting electrical apparatus on opposite sides of said vertical transverse partition wall member so that electrical apparatus having a temperature capability limit below a selected level extends within said first compartment and electrical apparatus having a temperature capability limit above said selected level extends into said second compartment;

(d) a second housing having air intake and exhaust openings therein sealingly disposed on top of said first housing and having a portion thereof arranged to provide a plenum chamber part of which extends beyond the front vertical wall member of said first housing, said plenum chamber including said exhaust opening therein in direct air flow communication with the air intake opening in the top horizontal wall member of said first housing and being covered on top by a wall member a portion of which is adapted to provide a desk-like working surface and another portion of which is adapted for mounting electrical devices with at least a portion thereof extending within said plenum chamber; and (e) means for establishing a flow of air to said plenum chamber operative to pressurize and cool said chamber and the electrical devices disposed therein as well as pressurizing said first housing and establishing a series air flow cooling path therein through said first compartment from top-to-bottom and back to the top thereof and through the air flow communicating passage to the top of said second compartment and through said second compartment to said exhaust opening disposed near the bottom of the back vertical wall member of said first housing.

References Cited

UNITED STATES PATENTS

| | | | |
|---|---|---|---|
| 1,437,491 | 12/1922 | Bronnert | 34—210 XR |
| 2,312,986 | 3/1943 | Buck | 34—211 |
| 2,468,719 | 4/1949 | Earle | 62—382 XR |
| 3,019,620 | 2/1962 | Costantini | 62—382 XR |
| 3,150,584 | 9/1964 | Allander | 98—33 |

MEYER PERLIN, *Primary Examiner.*

UNITED STATES PATENT OFFICE
CERTIFICATE OF CORRECTION

Patent No. 3,364,838                      January 23, 1968

Guy D. Bradley

It is hereby certified that error appears in the above numbered patent requiring correction and that the said Letters Patent should read as corrected below.

Column 9, line 7, for "lower" read -- lowest --; line 19, for "of", first occurrence, read -- to --; column 9, line 51, for "limits" read -- limits, --.

Signed and sealed this 18th day of March 1969.

(SEAL)
Attest:

Edward M. Fletcher, Jr.                      EDWARD J. BRENNER
Attesting Officer                            Commissioner of Patents